US005628867A

United States Patent [19]

Renaud

[11] Patent Number: 5,628,867

[45] Date of Patent: May 13, 1997

[54] AUTOMATIC PASTER FOR WALLPAPER BORDERS

[76] Inventor: Frederic T. Renaud, 1031 Sunset Dr., Basking Ridge, N.J. 07920

[21] Appl. No.: 445,426

[22] Filed: May 19, 1995

[51] Int. Cl.[6] .................................................... B32B 31/00

[52] U.S. Cl. .......................... 156/574; 156/524; 156/575; 156/577; 156/579

[58] Field of Search .................................... 156/523, 524, 156/574, 575, 577, 578, 579

[56] References Cited

U.S. PATENT DOCUMENTS

| | | | |
|---|---|---|---|
| 148,129 | 3/1874 | Miner . | |
| 481,251 | 8/1892 | Barton | 156/575 |
| 992,533 | 5/1911 | Atkinson . | |
| 3,112,225 | 11/1963 | Harms . | |
| 3,979,242 | 9/1976 | Holland et al. . | |
| 4,086,121 | 4/1978 | Ames . | |
| 4,210,485 | 7/1980 | Lake | 156/577 |
| 4,452,663 | 6/1984 | Heaton | 156/575 |
| 4,775,442 | 10/1988 | Januska . | |
| 4,806,184 | 2/1989 | Shannon . | |
| 5,114,527 | 5/1992 | Stern et al. . | |
| 5,280,869 | 1/1994 | Ricci | 242/588.2 |
| 5,328,543 | 7/1994 | Campagna . | |
| 5,403,430 | 4/1995 | Araujo et al. | 156/524 X |

*Primary Examiner*—James Engel
*Attorney, Agent, or Firm*—Kenneth P. Glynn, Esq.

[57] ABSTRACT

The handheld paper border pasting and dispensing device has a container for holding a quantity of liquid paste. Preferably, unistructural with the container are two side arms which provide attachment for a paper holder below the container. Also, preferably unistructural with the container are two harness plates which provide attachment for a paper guide from the rear of the container. The paper guide redirects a paper border in a transverse direction for application against a wall or near vertical surface. A flow regulator is attached to the container for providing control of paste being dispensed from the container. Also attached to the container over the flow regulator is a contact guide which has a seal portion for sealing off part of the flow regulator not in contact with a paper border.

20 Claims, 5 Drawing Sheets

AUTOMATIC PASTER FOR WALLPAPER BORDERS

BACKGROUND OF THE INVENTION

1. Field of the Invention

The present invention relates generally to devices for pasting and applying a paper onto a wall. In its particular aspects, the present invention is a handheld device which automatically applies a paste onto a paper border and then redirects the pasted paper border in a transverse direction for horizontal application onto a wall or near vertical surface.

2. Information Disclosure Statement

Devices, machines or assemblies which attempt to paste a paper for adhesion onto a surface have been invented and reinvented for over a century. They were initially made into boxlike configurations with many moving parts such as rollers, belts and pulleys, chain driven sprockets and gears for moving the paper over a paste and onto a surface. Employing a multitude of moving parts rendered these devices unreliable for continuous operation and costly to maintain. Where the devices were more simple, they did not provide for automatic pasting and dispensing of paper onto a wall surface in one operation. Later, the inventions concentrated on a building construction need to cover flat joints between pieces of fastened drywall or gypsum boards. These devices utilized a special purpose paper and compound commonly referred to in the building trades as "tape and mud". These devices were not intended for final finish applications. The adhesive or "mud" employed has a putty like consistency with strong capillary tension properties. As a consequence, the devices invented were not intended for liquid consistency pastes employed in applying paper border. None of the inventions to date solved the problems encountered with applying a paper border in a horizontal direction onto a vertical surface such as a wall. All the inventions to date feed the paper in a longitudinal direction. Consequently, to promote even distribution of paste onto the paper by gravity flow, the device had to be kept upright while the pasted paper was twisted by hand and manipulated onto the wall by hand.

U.S. Pat. No. 148,129 describes a machine for specifically applying paper vertically, from top to bottom, onto a vertical surface such as a wall. The bulkiness of the device rendered it cumbersome to operate as intended. Moreover, the device as described required rotating parts to move the paper over a reservoir of paste and out in a longitudinal fashion. The moving parts rendered this prior device unreliable for continuous operation and resulted in greater complexity and maintenance costs. Moreover, the device if turned sideways for horizontal application to a wall surface was prone to substantial spillage, leakage and uneven pasting of the paper. Unlike this prior invention, the present invention has no moving parts, automatically pastes the paper with the container in an upright position, and redirects the paper in a transverse direction for horizontal applications.

U.S. Pat. No. 992,533 also describes a machine for specifically hanging wall paper onto a vertical wall or ceiling. This device in its most extended configuration stood as tall as the height of a room from the floor to ceiling. The device employed many moving parts such as rollers, chain driven sprockets, gears, casters and pivoting cross members. Moreover, the device had to be moved on the floor for ceiling applications and crank operated for wall applications. These characteristics rendered the invention bulky and cumbersome to use, unreliable for consistent uninterrupted operation, and costly to maintain. In contrast, the present invention has no moving parts, is easily maneuvered about a wall surface by hand, and automatically redirects the paper in a transverse direction, pasted side away, for horizontal applications on a wall surface.

U.S. Pat. 3,979,242 describes a device for applying a paste to a precut length of paper to hang vertically onto a wall. The device described required several rotating parts to move the paper over the paste. Hence, it was not as reliable as the present invention which has no moving parts. Moreover, the method of this invention required the user to set the device on the floor and pull upwards a section of paper long enough to cover the wall from floor to ceiling. Then the user was required to apply this pasted length of paper onto the wall by hand. This methodology rendered the device cumbersome and inefficient. The user was required to manipulate about an eight foot length of wet pasted wall paper onto a wall. Then the user was required to press out the wrinkles or air pockets developed during the initial hanging, and maneuver the paper into proper alignment with paper sections already hung. There was no provision for automatically redirecting the paper in a transverse direction, pasted side away, for horizontal applications onto a wall surface. In contrast, the present invention is a small lightweight device with no moving parts, which automatically pastes and redirects the paper border in a transverse direction for horizontal application onto a wall surface.

U.S. Pat. No. 3,112,225 describes a device for applying paper and adhesive, more commonly known as "tape and mud" in the building trade, to drywall or gypsum board joints. The device described is more suitable for automatic dispensing of pasted paper horizontally onto a surface such as a ceiling, not a wall. Application of the paper horizontally onto a surface such as a wall, required a user with proficient hand and finger dexterity to pull and twist the paste laden paper ninety degrees and apply over the horizontal wall joint, while keeping the device upright. Hence, for horizontal wall applications this prior device required a user of considerable skill to manipulate the paste laden paper with one hand while maintaining the device upright with the other hand. Whereas, the present invention automatically redirects the paper in a transverse direction for effortless horizontal application onto a wall surface.

U.S. Pat. 4,086,121 is an invention of a device intended to paste and apply a paper to drywall or gypsum board joints. The device utilized an assemblage of moving parts such as rollers, springs, piston acting levers, gears, chain driven sprockets and linkages to extract a mastic from a filler tube onto an advancing roll of wall paper. The multitude of moving parts rendered this device unreliable for continuous operation, complicated to repair and costly to maintain. Moreover, this device employed a mechanically induced pressure plate to dispense the paste onto the paper. The paste or "mud" typically employed is a thick putty like substance with sufficient capillary tension to hold itself together and not render the device prone to excessive leakage and spillage. However, this pressure plate method would not be suitable for liquid consistency pastes typically employed when applying a paper border in a horizontal direction against a wall surface. In stark contrast, the present invention has no moving parts and employs gravity flow of a liquid paste from a closed container. Thereby rendering the present device more reliable, more cost efficient, and not prone to leakage or spillage.

U.S. Pat. No. 4,775,442 details a device for covering cracks or joints between abutting drywall or gypsum board joints in building construction applications. The device employs an external supply of pressurized adhesive applied to the paper through a nozzle in the device. A pressurized system is better suited to adhesives or compounds with a putty like consistency where strong capillary tension will minimize spillage and leakage, and inappropriate for liquid consistency pastes which easily spill. Furthermore, a pressurized system inherently entails greater complexity, higher maintenance costs, and safety concerns which render the device more suitable for a highly skilled or knowledgeable user. In contrast, the present invention relies on gravity flow to dispense the liquid paste, while the liquid paste container is maintained in a vertical position. Moreover, the paper border is automatically twisted for horizontal application. The present invention device is also lightweight and easy to maneuver about a room without any constraints from supply hoses.

U.S. Pat. 4,806,184 describes a device that does not paste the wall paper prior to application onto a wall surface. Operation of this prior invention requires the user to precut the required length of wall paper and loosely roll that paper onto a spool. Then the loosely rolled wall paper must be submerged in a trough of water or water and paste solution. When the adhesive is sufficiently activated the loosely rolled paper is inserted into the device. As described, this prior art device has several shortcomings. Extensive hand manipulation of the wet pasted paper is required prior to actually applying the paper onto a wall surface. Moreover, the unpasted side of the paper must be a material or have a coating which will prevent the unpasted side of the paper from being adversely affected by the activated paste when the loosely rolled paper is placed from the trough into the device. Whereas, the present invention overcomes this problem by automatically pasting and redirecting the wall paper in a transverse direction in one smooth operation for application onto a wall surface.

U.S. Pat. No. 5,328,543 describes an invention for applying border paper to the ceiling line of walls using basically a roller on a stick. In actual use, the roller housing is leaned against a wall at a desired height by resting the housing with its stick on the floor. As described, the user must then with both hands pull out a section of the border paper from the housing, paste this pulled out portion of paper by hand, apply this pulled out portion of paper by hand, and remove any wrinkles and paste by hand. In essence, this invention merely holds up a roll of paper border while a strung out section is hand applied so that another section can be applied without any cut seams. This prior invention does not automatically paste and redirect the paper border in a transverse direction for horizontal surface application in one continuous motion as the present invention does. Also, contrary to the prior invention, the present invention automatically wipes out wrinkles as the paper border is applied onto a wall surface.

SUMMARY OF THE INVENTION

The present invention is a device which automatically pastes and redirects an unwinding roll of paper border in a transverse direction for horizontal application onto a wall or near vertical surface. The preferred embodiment of the present invention consists of a liquid paste container with an outlet at the bottom back of the container. Attached over the outlet is a flow regulator for controlling the dispensing of liquid paste from the container. The flow regulator preferably comprises a linear series of rectangular cutouts separated by protruding ribs which maintain uniform flow distribution of liquid paste onto the advancing paper border. A contact guide attaches to the container against the rectangular cutouts to assure contact pressure between an advancing paper border and the rectangular cutouts and seal off the rectangular cutouts that extend beyond the width of the paper border. A paper holder is attached to two side arms which in turn attach to the container. Preferably, the side arms and the container 103 are a unistructural component. Attached to the container from the rear of the container are two harness plates which in turn may have attachment slots for a paper guide, preferably positioned at forty five degrees from the horizontal. Preferably, the harness plates and container are a unistructural component. In a typical application, the roll of paper border unwinds from the paper holder 109 and advances between the rectangular cutouts and the contact guide, over the paper guide and out in a transverse horizontal direction, as the container is moved away in a direction against a wall or near vertical surface, opposite to this transverse horizontal direction. The paper guide is reversed by altering its attachment to the harness brackets one hundred eighty degrees to provide an alternate crosswise diagonal, thereby, allowing the pasted paper border to be applied in the opposite horizontal direction.

An alternative embodiment of the present invention consists of a liquid paste dispensing container attached to a frame, and a paper holder attached to the frame below the container. The frame has a forty five degree diagonal paper guide. As an option, the frame can be modified to allow the liquid paste dispensing container to pivot so as to maintain a vertical position for promoting gravity flow of liquid paste while applying the paper border onto a surface sloped away from the vertical.

BRIEF DESCRIPTION OF THE DRAWINGS

The invention will be more fully understood when the specification herein is taken in conjunction with the drawings appended hereto, wherein.

DETAILED DESCRIPTION OF THE PRESENT INVENTION

The present invention provides a device for automatically pasting and redirecting a paper border in a transverse direction for application in a horizontal fashion onto a wall surface. The terms used herein will be explained and expounded to aid in the understanding of the present invention and its operation. The terms and uses described herein are for illustrative purposes and are by no means all inclusive. The term "frame" as used herein means a supporting structure in skeletal form or planar form. The frame may be made from various rigid materials such as plastic, metal or combinations thereof.

The frame can be unistructurally formed or formed from pieces of the above materials. The term "container" may be but is not restricted to rectilinear, spherical, or tapered shaped containers, or variations thereof. The container may have a snap on lid, a threaded mating cap, or be a removable prefilled cartridge. The container may be made of rigid materials such as plastic or formed from a sheet metal. The terms "attached", "secured" or terms of similar intent as used herein, may include but are not limited to mechanical fasteners such as mating threaded types, snap on types, hinge types, clevis or cotter pin types, or exothermically welded with a filler metal. Moreover, "attached" and other terms of similar intent, may include joining two materials by methods employing chemical solvent welds or plastic welds.

The term "unistructural" as used herein may include molded extrusion, or any form of permanent attachment such as exothermic welding for metal type materials, or chemical or solvent welding for plastic type materials.

The term "paper holder" as used herein may be a rod, cylinder, or a cylindrical series of convex shaped wires for securing a roll of paper border. The paper holder may be attached to the frame of the present invention so as to permit the paper holder to rotate. This may be accomplished by fitting the paper holder in a sleeve bearing in the frame, or the paper holder as a rod can be loosely fitted into a hole in the frame to permit rotation. Alternatively, the paper holder may be fixed to the frame so that a roll of paper border rotates about the paper holder.

The term "paper border" may mean a cellulose pulp material, a woven fabric material, a vinyl or plastic material, a metal type material, or combinations and variations thereof. The paper may be suitable not only for accenting purposes, but also to entirely cover surfaces and finish construction joints. The paper border in its typical application will be applied by the present invention in a horizontal direction onto a surface such as a wall. However, the potential application for the paper border also includes sloping surfaces, packaging materials, furniture, doors, and articles of manufacture. The term "paste" or "liquid paste" as used herein includes adhesives, mastics, glues, cements, or plasters of consistency suitable for the application intended.

Figure 1:
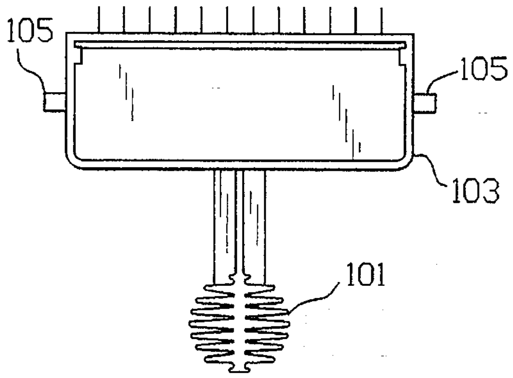
FIG. 1 is a top view of a present invention automatic paper border paster.

The preferred embodiment of the present invention, a handheld paper border pasting and dispensing device, is depicted by various views in FIGS. 1 to 7. FIG. 1 shows a top view where an optional handle 101 is attached to the centerline of the container 103 at the front surface of the container 103 for improved balance in holding the paper border pasting and dispensing device. The handle 101, may be extruded or formed from a plastic container 103 or plastic welded to a plastic container 103. Alternatively, a metal handle 101 may be attached to a metal container 103 by mechanical means such as mating male female threaded fasteners or exothermic welds with a filler metal. However, the optional handle 103 is not necessary for practicing the present invention as described herein. The container 103 has a removable snap on cap 107 to permit refilling of the container 103 with a liquid paste. Alternatively, the cap may be a threaded cover mating with a male threaded top opening in the container 103.

Figure 2:
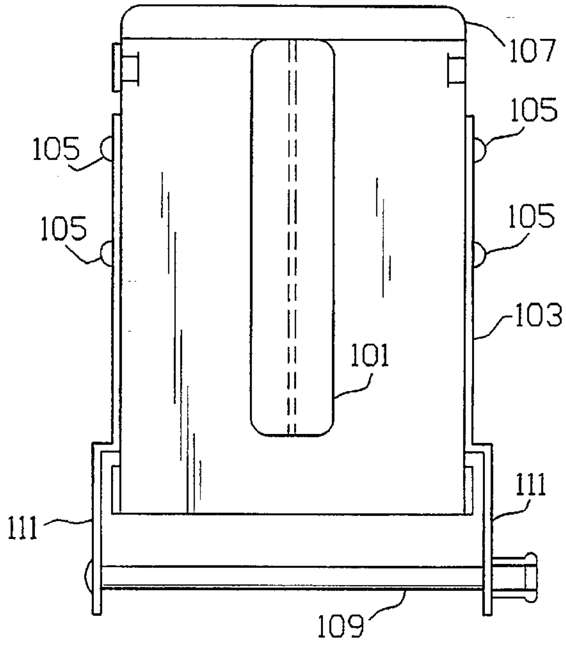
FIG. 2 is a front view of the present invention depicted in FIG. 1.

As depicted in FIG. 2, a view of the front surface of the container 103, the container 103 has four protrusions 105, which accept two side arms 111 with holes corresponding to the four protrusions 105. The two side arms 111 are secured to the container 103 with appropriate mating fasteners fitted onto the four protrusions 105. These mating fasteners may be threaded, snap on types, or cotter or clevis pin types. However, it is preferable that the side arms 111 and the container 103 are a unistructural component.

Figure 3:
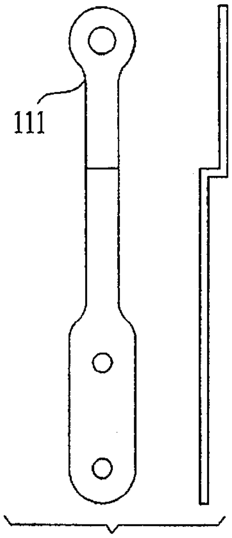
FIG. 3 is front and side views of an element depicted in FIG. 2.

In the preferred embodiment, the paper holder 109 snap fits to the bottom of the two side arms 111 as a cylindrical rod. In another version, the rod end can be a threaded type which is secured between the two side arms 111 by a mating female threaded end cap. A side view of the side arms Ill is depicted in FIG. 3. In yet another alternative embodiment, the container 103, the two side arms 111 and the paper holder 109 can be a unistructural component. In such a manner the paper holder can be secured to the side arms 111 by a flexible plastic joint on one end and a snap in type joint on the other end. Alternatively, the paper holder 109 and the two side arms 111 may be a unistructural component for attachment to the container 103.

Figure 4:
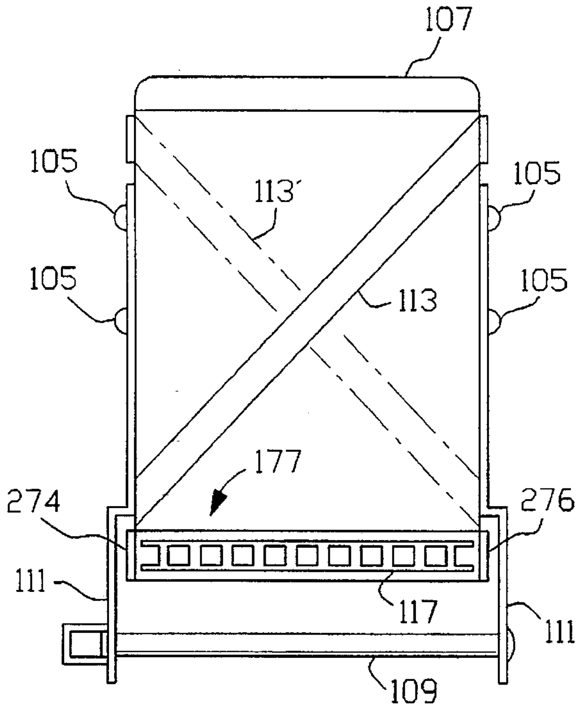
FIG. 4 is a rear view of the embodiment of the present invention depicted in FIG. 2.
Figure 5:
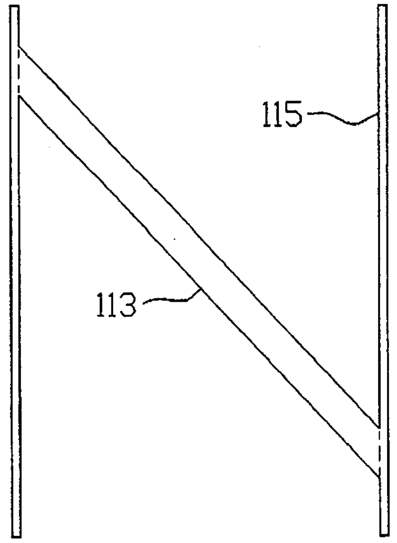
FIG. 5 is a view of a component shown in FIG. 4.

FIG. 4 depicts a view of the rear surface of the container 103 shown in FIGS. 1 and 2. The rear surface view shows a paper guide 113 which can be in either of two diagonal positions to provide for left or right transverse movement of a pasted paper border against an application surface which is to receive the pasted paper border. Preferably, the diagonal is forty five degrees from the horizontal in FIG. 4. The paper guide 113, as depicted in FIG. 5, can be reversed in one of two manners. As an assembly, the paper guide 113 may snap into corresponding slots in harness plates 115. In turn, the harness plates 115, with holes corresponding to the four protrusions 105 on the container 103, may fit over or under the two side arms 111. Preferably, the harness plates 115 and the container 103 and the side arms 111 are a unistructural component. To reverse the diagonal of the paper guide 113, the paper guide 113 would simply be unsnapped and resnapped into two opposing slots in the harness plates 115. Alternatively, the paper guide 113 and harness plates 115 can be a unistructural component, with the paper guide 113 reversed by rotating the entire component one hundred eighty degrees to a cross diagonal position 113'.

Figure 6A:
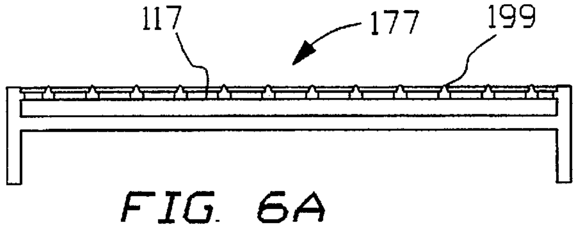
FIG. 6A is a detailed side view of flow regulator 177 of the embodiment of the present invention shown in FIG. 4.
Figure 6B:
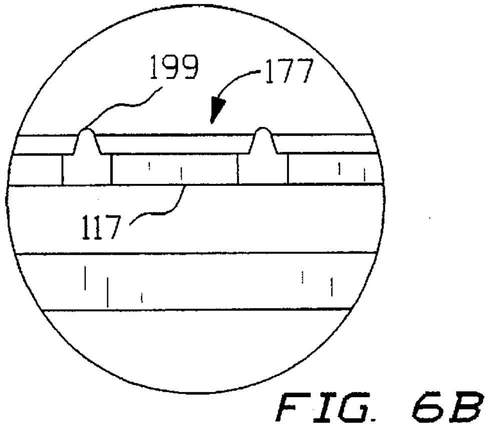
FIG. 6B is a partial blow-up-thereof.

Shown in FIGS. 6A and B and 7 are details of regulating the flow of liquid paste onto an advancing paper border. FIG. 6A is a detailed side view of flow regulator 177 of the embodiment of the present invention shown in FIG. 4, and FIG. 6B is a partial blow-up thereof. Flow from the container 103 is by gravity through an opening (not shown) in the container 103 which is fitted with a flow regulator 177. The flow regulator 177 consists of a linear series of rectangular cutouts 117 which are separated by protruding ribs 199. As a paper border is advanced over the flow regulator 177, flow of paste is assisted by the capillary action of liquid paste already dispensed on the advancing paper border. A contact guide 220 has a band 222 which is positioned against the rectangular cutouts 117 by way of slots 268 and 270, in the angled ends of the band 222, snap fitting over protrusions 274 and 276 on the container 103 (see FIG. 4). The band 222 is essentially an elongated flat bar with predetermined angled ends which are attached to the container. The band 222 has a seal portion 224 which is pressed by the band 222 against the flow regulator 177, thereby keeping an advancing paper border against the rectangular cutouts 117 and ribs 199. The seal portion 224 also serves to close or seal off any rectangular cutouts 117 that extend beyond the width of a paper border. The seal portion 224 may be a convex shaped cellophane coated elastomeric or foam strip for the width of the frame. The ribs 199 serve to maintain an even distribution of liquid paste flow from the rectangular cutouts 117 onto the paper border by preventing flow from one rectangular cutout 117 crossing over to where paste from another rectangular cutout is flowing onto the paper border. In other words, the ribs act as dividers maintaining the flow distribution of liquid paste from the container 103 uniformly across an advancing paper border.

Figure 8:
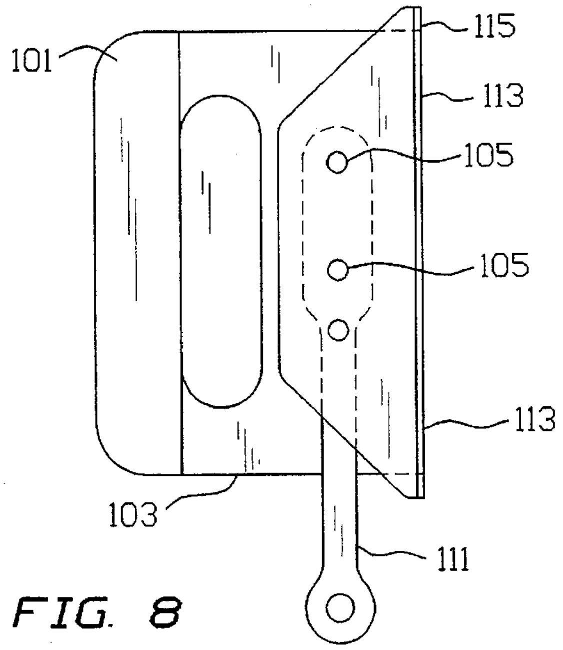
FIG. 8 is a side view of the present invention shown in FIG. 4.
Figure 7:
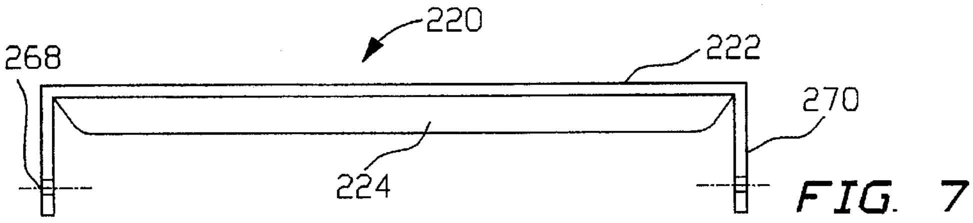
FIG. 7 is a top view of a contact guide.

Shown in FIG. 8 is a side view depicting the relative positions of the various components such as the container 103, handle 101, sidearms 111, and harness 115 with paper guide 113.

Figure 9:
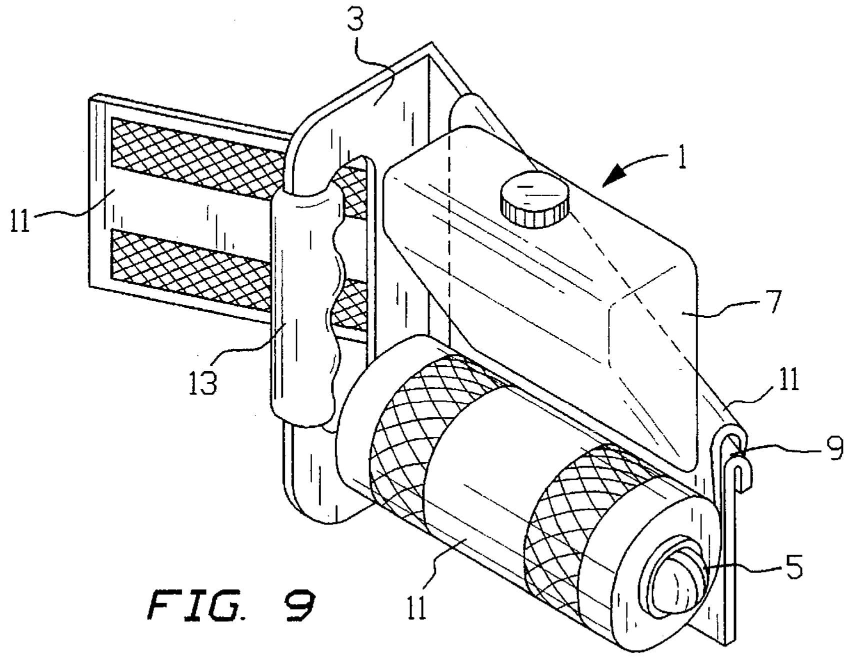
FIG. 9 shows a front perspective view of an alternative embodiment of the present invention automatic paper border paster.

Referring now to FIG. 9 there is shown a front perspective view of an alternative embodiment of a handheld paper border pasting and dispensing device. A frame 3, is formed from a rigid sheet material, such as metal or plastic, into two perpendicular surfaces extending from a corner (FIG. 9 is a view from the inside of this corner). The left side of the frame 3 is modified to a handle 13 for a person to grasp and move the frame 3 corner against and relative to an application surface which is to accept the pasted paper border 11.

The right side of the frame 3, in FIG. 9, is extended away from the corner in a width sufficient to accommodate a roll of paper border 11. The paper guide 9, an upper edge of this right side of the frame 3, is shaped into an inverted "U" pattern which is inclined at forty five degrees, upward from the end of the right side of the frame to the corner. Alternatively, the paper guide can be a small diameter roller diagonally attached to the frame 3. The container 7 is secured to the left side of the frame 3, utilizing any one of several mechanical means such as threaded or snap on type male female mating fasteners. The back or flat side of the container 7 contiguous to the right side of the frame 3 is spaced sufficiently from this right side of the frame 3 to allow passage of the paper border 11 through this space. The paper holder 5, which is secured to the left side of the frame 3, may be attached to the frame 3 by mechanical means such as threaded or snap on type male female fasteners or by chemical means such as plastic welds or adhesives. The roll of paper border 11 may freely rotate about the paper holder 5 so as to advance the paper border 11 over and past the paper guide 9. Alternatively, the paper holder 5 may freely rotate about its longitudinal axis to permit advancement of the paper border 11 over and past the paper guide 9.

Figure 10:
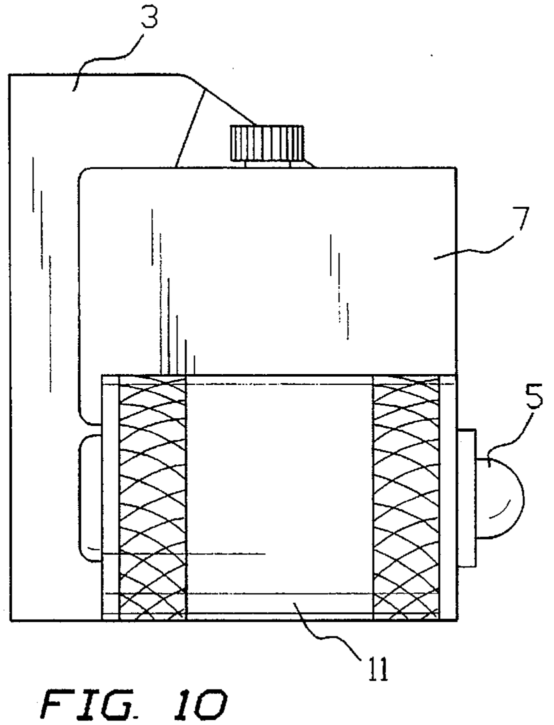
FIG. 10 shows a front view of the embodiment depicted in FIG. 9.
Figure 11:
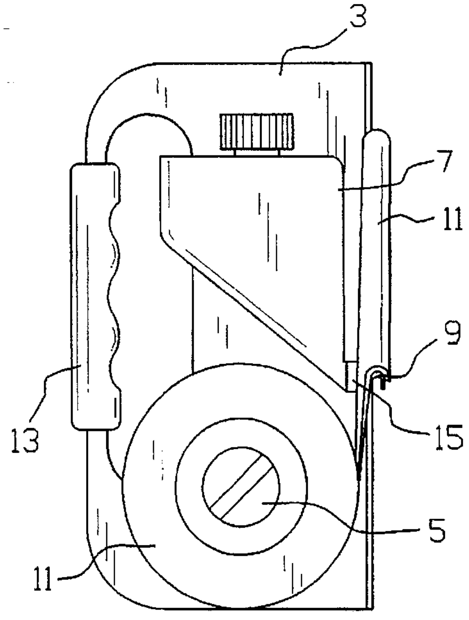
FIG. 11 shows a side view of the present invention depicted in FIG. 9.

FIG. 10 depicting a front view of the handheld paper border pasting and dispensing device, shows the relative positions of the various elements discussed above. The roll of paper border 11 and its paper holder 5 are situated below the container 7. A side view of the present invention is depicted in FIG. 11. The outlet 15 is located at the bottom flat side of the tapered portion of the container 7 so as to make contact with the paper border 11 advancing over and past the paper guide 9. The outlet 15 is the medium by which the liquid paste in the container 7 is dispelled onto the advancing paper border 11. The paper border 11, pasted side away from the paper guide 9, is advanced over this paper guide 9 so that the pasted side of the paper border 11 is now facing an application surface which is to receive the pasted paper border 11.

Once the pasted side of the paper border 11 is initially applied to the application surface, the adherence properties of the liquid paste will cause the roll of paper border 11 to advance as the frame 3 is moved against the application surface and horizontally away from the place of initial contact between the application surface and the now pasted paper border 11. The forty five degree incline of the paper guide 9 allows the advancing pasted paper border 11 to be applied in a transverse direction. Transverse direction meaning a direction perpendicular to the longitudinal direction of the unwinding roll of paper border 11. This allows one to maintain the container 7 in an upright position so as to promote gravity flow of liquid paste in the container 7 through the outlet 15 onto the advancing paper border 11.

Figure 12:
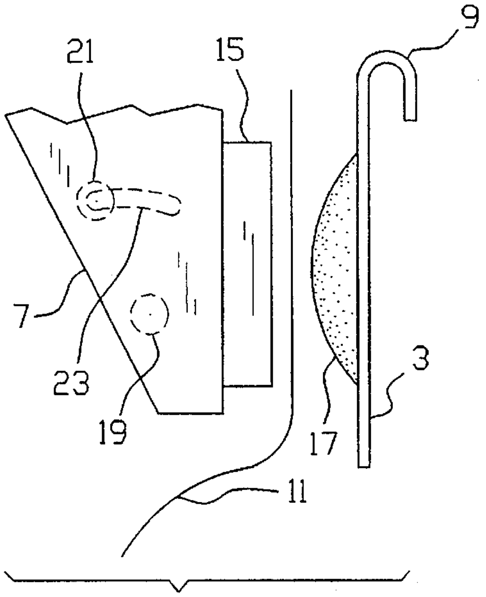
FIGS. 12, 13, 14 and 15 are details depicting a method for applying liquid paste onto paper border in the embodiment of FIG. 9.
Figure 13:
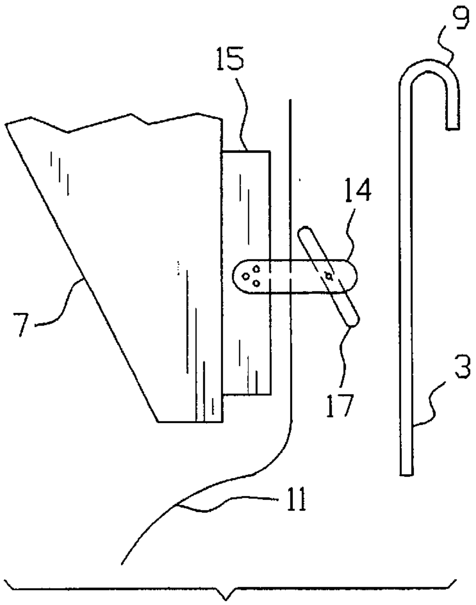
Figure 14:
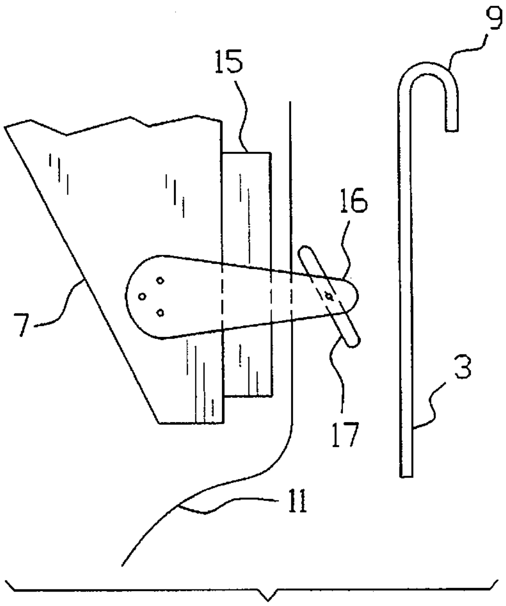
Figure 15:
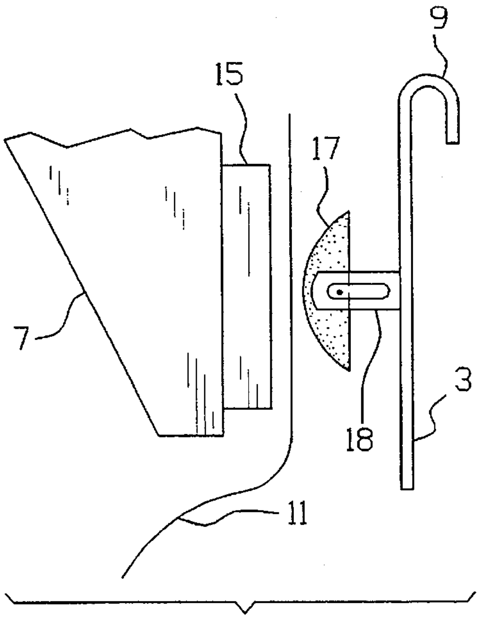

An enlarged view of a device for applying a liquid paste onto the paper border 11 is detailed in FIG. 12. The paper border 11 is advanced through a gap between the outlet 15 and a contact guide 17. The contact guide 17, which can be a convex shaped cellophane coated elastomeric or foam strip adhered for the width of the frame 3, is for maintaining contact between the paper border 11 and the outlet 15 by applying pressure to the unpasted side of the paper border 11. FIG. 13 shows an alternative embodiment where the contact guide 17 is a rotatable flat bar attached to the outlet 15 by arms 14 as one complete applicator assembly. In another alternative embodiment, FIG. 14, the contact guide 17 is a rotatable flat bar attached to the container 7 by arms 16. In yet a further embodiment shown in FIG. 15, the contact guide 17 is a convex shaped protrusion sliding in slots in arms 18 on the frame 3. The contact guide 17 in the various views can be secured to the arms 14,16,18 by rivets or mating threaded fasteners. It is noted however, as FIG. 11 depicts, another method would be to have a gap between the outlet 15 and frame 3 sufficiently small enough to direct the paper border 11 against and past the outlet 15 and over the paper guide 9.

Moreover, FIG. 12 depicts an option to pivot the container 7 away from the frame 3 to maintain the container 7 in a vertical position. This pivoting movement of the container facilitates applying the paper border 11 on an application surface sloped away from the vertical. The fastener 19 supports the container 7 at a point from which the container 7 pivots. The fastener 21 can be loosened to move in a corresponding radial slot 23 in the frame 3. The fasteners 19 and 21 may be thumb screw type female threaded to mate with male threaded protrusions on the container 7.

Figure 16:
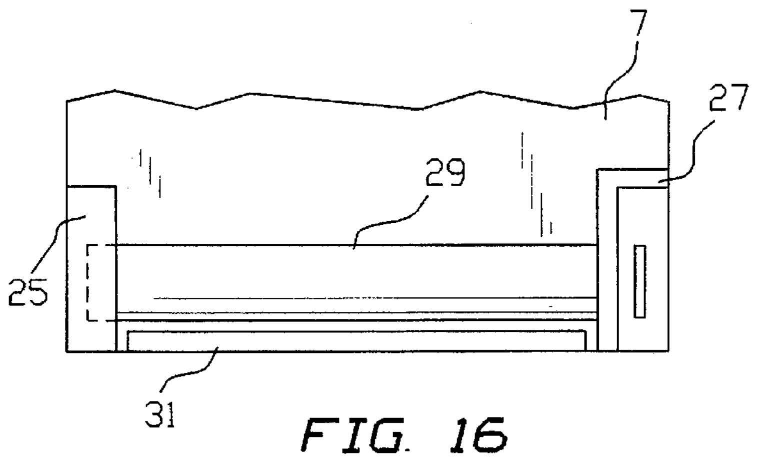
FIG. 16 is a detail depicting a method for regulating the flow of liquid paste in the embodiment of FIG. 9.
Figure 17:
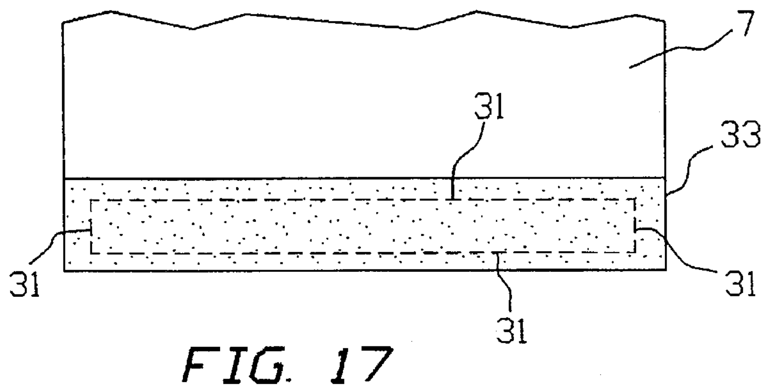
FIG. 17 depicts an alternative embodiment to that illustrated in FIG. 16.
Figure 18:
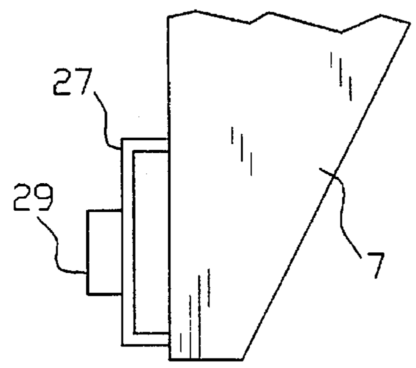
FIG. 18 is a side view of FIG. 16.
Figure 19:
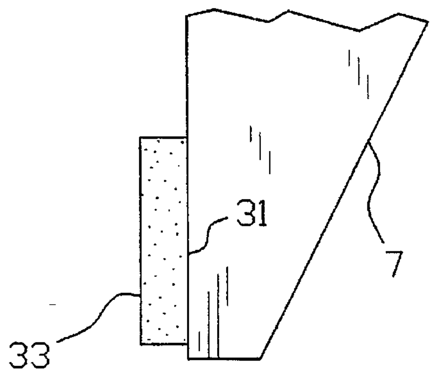
FIG. 19 is a side view of FIG. 17.

Alternative embodiments of the outlet (15 in FIG. 12) for dispensing liquid paste onto the advancing paper border 11 are depicted in FIGS. 16 and 17. FIG. 16 shows an adjustable flow method where a sliding bar 29 may be moved in the direction permitted by the retaining guides 25 and 27 so as to expose a cutout 31 in the container 7 as the sliding bar 29 is moved away from the cutout 31. The cutout 31 may be one rectangle, cut the width of the container 7, as shown in FIG. 5, or a series of smaller cutouts in various shapes, such as triangles, rectangles, squares, circles or variations thereof (see FIG. 4). As the sliding bar 29 is moved away from the cutout 31, the increased free area of the cutout 31 allows the liquid paste to flow through at an increased rate, thereby allowing the paper border 11 to be applied at an increased rate. Conversely, moving the sliding bar 29 to reduce the free area of the cutout 31 reduces the rate of flow of the liquid paste onto the paper border 11. Alternatively, the outlet 15 may consist of a sponge like membrane 33, or other porous substance, over a cutout 31, as depicted in FIG. 6. The rate of flow of liquid paste onto the paper border 11 will depend on the area of the cutout 31, the porosity of the sponge like membrane 33, and the viscosity of the liquid paste.

Obviously, numerous modifications and variations of the present invention are possible in light of the above teachings. It is therefore understood that within the scope of the appended claims, the invention may be practiced otherwise than as specifically described herein.

What is claimed is:

1. A handheld paper border pasting and dispensing device, which comprises;

a) a container for holding a quantity of paste, said container having a front surface, a back surface, an outlet on said back surface, two side arms, and two harness plates;

b) a paper holder attached to said two side arms for holding a paper border;

c) a flow regulator attached to and over said outlet on said container for dispensing a paste from said container onto a paper border; and, d) a contact guide attached to said container over and against said flow regulator for sealing portion of said flow regulator not in contact with a paper border; and, e) a paper guide attached to said harness plates from said back surface side of said container for redirecting a paper border in a transverse direction.

2. The device of claim 1, wherein said paper holder is a cylindrical rod.

3. The device of claim 1, wherein said paper guide is a flat rectangular shaped elongated bar oriented in a forty five degree diagonal position.

4. The device of claim 1, wherein said flow regulator is a linear series of rectangular cutouts.

5. The device of claim 4, wherein said flow regulator further comprises ribs, said ribs being protrusions between said rectangular cutouts for maintaining uniform flow distribution of paste from said container onto a paper border.

6. The device of claim 1, wherein said contact guide is a band with a seal portion attached to said band.

7. The device of claim 6, wherein said band is an elongated flat bar with predetermined angled ends for attachment to said container and said seal portion is a convex shaped cellophane coated elastomeric strip having a width at least equal to the width of said flow regulator.

8. The device of claim 1, wherein said two side arms are detachable from said container.

9. The device of claim 8, wherein said two side arms and said paper holder are a unistructural component.

10. The device of claim 9, wherein said paper holder is a cylindrical rod.

11. The device of claim 1, wherein said harness plates are detachable from said container.

12. The device of claim 11, wherein said paper guide and said harness plates are a unistructural component.

13. The device of claim 9, wherein said paper guide is a flat rectangular shaped elongated bar oriented in a forty five degree diagonal position.

14. The device of claim 8, wherein said harness plates are detachable from said container.

15. The device of claim 14, wherein said paper guide is a flat rectangular shaped elongated bar oriented in a forty five degree diagonal position.

16. The device of claim 15, wherein said flow regulator is a linear series of rectangular cutouts.

17. The device of claim 16, wherein said flow regulator further comprises ribs, said ribs being protrusions between said rectangular cutouts for maintaining uniform flow distribution of paste from said container onto a paper border.

18. The device of claim 17, wherein said contact guide is a band with a seal portion attached to said band.

19. The device of claim 18, wherein said band is an elongated flat bar with predetermined angled ends for attachment to said container and said seal portion is a convex shaped cellophane coated elastomeric strip having a width at least equal to the width of said flow regulator.

20. The device of claim 19, further comprising a handle, said handle being centrally attached to said container from said front surface side of said container.

* * * * *